(No Model.)

A. D. ELLIOTT.
HEEL TRIMMING MACHINE.

No. 374,892. Patented Dec. 13, 1887.

Witnesses.
Howard F. Eaton
Fred L. Emery

Inventor.
Alvin D. Elliott
by Crosby & Gregory
Attys.

UNITED STATES PATENT OFFICE.

ALVIN DIGHTON ELLIOTT, OF LAWRENCE, ASSIGNOR TO JAMES W. BROOKS, TRUSTEE, OF CAMBRIDGE, MASSACHUSETTS.

HEEL-TRIMMING MACHINE.

SPECIFICATION forming part of Letters Patent No. 374,892, dated December 13, 1887.

Application filed August 15, 1887. Serial No. 246,992. (No model.)

*To all whom it may concern:*

Be it known that I, ALVIN DIGHTON ELLIOTT, of Lawrence, county of Essex, and State of Massachusetts, have invented an Improvement in Heel-Trimming Machines, of which the following description, in connection with the accompanying drawings, is a specification, like letters on the drawings representing like parts.

This invention is an improvement on that described in United States Patent No. 321,017, dated June 30, 1885, and especially as to the means for adjusting the follower, whereby the same is materially simplified.

Figure 1:
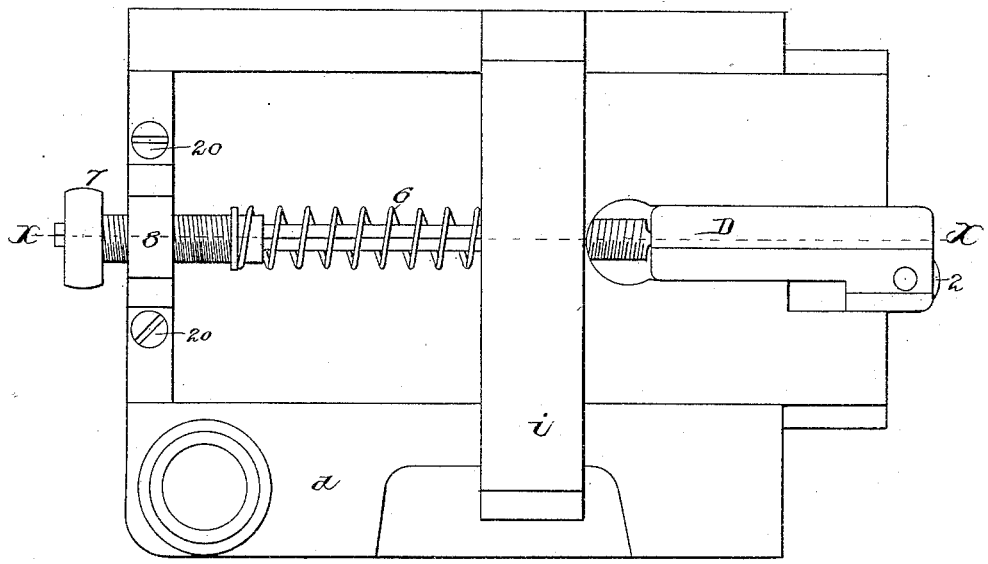
Figure 2:
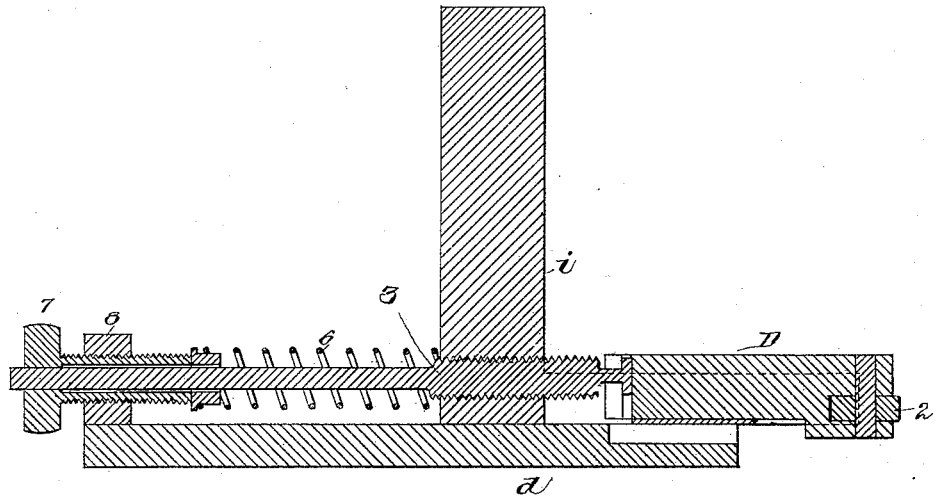

Figure 1 in plan view represents a sufficient portion of a heel-trimming machine, which, taken in connection with the machine described in the said patent, will enable my invention to be understood; and Fig. 2, a section in the line $x$, Fig. 1.

The turn-table $d$, the bearing-block or knife-carrying slide $i$, and the follower D, with its roll 2 and spring 6, are all as in the said Patent No. 321,017, where they are designated by like letters; so the said parts need not be herein specifically described. Herein, as in the said patent, it is desired to retain the pressure of the said spring uniform under all adjustments of the knife-carrying slide. Herein the shank of the screw 3, extended through the bearing-block $i$ and connected to the follower D, instead of being cylindrical, as in the said patent, is square or many-sided and receives upon it a thumb-nut, 7, having a hole which in cross-section corresponds with the cross-section of the shank of the screw, so that the rotation of the nut rotates the screw in unison with it.

The cylindrical shank of the nut 7 is screwed into a bearing, 8, attached by screws 20 to the turn-table $d$, and the inner end of the nut bears against a loose collar-like washer, which in turn bears against the spring 6, the parts being so combined and operated that the effective force of the spring remains the same under all adjustments of the knife-carrying slide $i$.

By making the shank of the rod many sided and fitting the nut 7 to it I am enabled to dispense with the slotted nut and with the pin to enter it, as in the said patent.

I claim—

In a heel-trimming machine, the turn-table, the bearing-block or knife-carrying slide, and spring, combined with a screw-rod having a many-sided shank and with a nut, 7, having a many-sided hole to fit the said shank, substantially as described.

In testimony whereof I have signed my name to this specification in the presence of two subscribing witnesses.

ALVIN DIGHTON ELLIOTT.

Witnesses:
 J. R. SMITH,
 N. E. MACK.